Patented Oct. 6, 1942

2,297,871

UNITED STATES PATENT OFFICE 2,297,871

RUBBER CEMENT

Arthur W. Campbell, Terre Haute, Ind., assignor to Commercial Solvents Corporation, Terre Haute, Ind., a corporation of Maryland No Drawing. Application October 17, 1938, Serial No. 235,459

9 Claims. (Cl. 260—760)

My invention relates to improvements in adhesive cements, and more particularly, to heat vulcanizing rubber cements containing rubber in an organic solvent.

Rubber cements are largely used in industry as adhesives, for coating fabrics followed by drying and vulcanizing, and also for the manufacture of rubber articles by single or multiple dipping of molds or forms in the cement followed by the drying of each mold separately and vulcanizing the whole.

The simplest type of rubber cement consists of rubber dissolved in an organic solvent such as naphtha, gasoline, benzol or carbon tetrachloride. Many other substances may be added to such cements, however, in order that desirable properties may be imparted to the cement. Certain rubber non-solvents such as alcohols, esters, ketones, sulfonated hydrocarbons, and the like, are often incorporated into rubber cements in order to reduce their viscosity and thereby permit, if desired, the incorporation therein of additional rubber. Fillers and softeners may also be added such as mineral oil, carbon black, clay and pigments. The heat vulcanizing cements also contain culvanizing agents such as sulfur, selenium or tellurium, and accelerators such as diphenyl guanidine, polybutyraldehyde-aniline or zinc dibutyl dithiocarbamate and an activator such as zinc oxide or stearic acid.

It has been necessary in the past with the heat vulcanizing rubber cements to make them up in two different portions, one solution generally comprising rubber, solvent, zinc oxide, and the vulcanizing agent and the other comprising rubber, solvent, zinc oxide, and the accelerator. The two solutions are then mixed just before use. This is necessary since the complete rubber cement containing the vulcanizing agents and the accelerator spontaneously tends to form irreversible gels, or vulcanize, after standing for a short time. Since the cement in this vulcanized gel form is not affected by the ordinary rubber solvents it is no longer utilizable as a cement and hence it has formerly been necessary either to make up only the amount of cement required for a particular job, or else discard the unused portion. This spontaneous vulcanization of the rubber cement at ordinary temperatures is entirely different from the gelling of non-vulcanizing cements. Cements of the latter type form reversible gels which may be dissolved by additional solvent or which may be inhibited by viscosity reducing agents such materials as acetone, ethyl alcohol, nitrobenzol, etc. These viscosity reducing agents have no beneficial effect with respect to inhibiting the irreversible gelling, or vulcanizing, of heat vulcanizing cements on storage at ordinary temperatures.

In my copending application U. S. Serial No. 145,786, filed June 1, 1937, I have disclosed the use of nitroparaffins as inhibitors for the irreversible gelling or vulcanization of heat vulcanizing rubber cements. I have now discovered that the addition of halogenated nitroparaffins to rubber cements of the heat vulcanizing types will likewise permit the mixing of the two components and give stable solutions which will not form irreversible gels or vulcanize, on long periods of standing at atmospheric temperature. I have further discovered that the addition of these halogenated nitroparaffins does not deleteriously affect the vulcanizing properties of the cements, and gives solutions stable over longer periods of time than are obtainable with the nitroparaffins. While I have found that the halogenated nitroparaffins in general are effective as inhibitors for the irreversible gelling or vulcanization of heat-vulcanizing rubber cement, I prefer to utilize the chloro- and bromonitroparaffins, containing not more than eight carbon atoms, and particularly 1-chloro-1-nitroethane, 1-chloro-1-nitropropane, and 1-bromo-1-nitropropane.

According to the present invention the complete rubber cement may be prepared in one solution and the halogenated nitroparaffin incorporated in any desired manner therein. The rubber stock may be prepared by incorporating the vulcanizing agent, the accelerator, the softener, and the filling material with the rubber, and the whole dissolved in some suitable solvent such as benzol, varnish and paint makers' naphtha, carbon tetrachloride or ethylene dichloride. To this solution a suitable amount of the halogenated nitroparaffin may be added which is sufficient to prevent the cement from spontaneously forming vulcanized gels on standing at atmospheric temperature. It may be desirable in certain instances to add the halogenated nitroparaffin directly to the rubber solvent before dissolving the rubber therein.

My invention may be illustrated by the following specific examples:

Example I

The following rubber stock was prepared by mill mixing:

| Ingredient | Parts by weight |
|---|---|
| Raw rubber | 100 |
| Sulfur | 3 |
| Zinc oxide | 5 |
| Zinc dibutyl dithiocarbamate | 0.5 |
| Polybutyraldehyde-aniline accelerator | 0.5 |

The above stock was dissolved in benzol in a concentration equivalent to 5% by weight of rubber. Various chloronitropropanes were added to separate portions of the resulting solution, and an additional portion of the solution was utilized as a "blank" without the addition of chloronitropropane. The various solutions were maintained at a temperature of 82° F. for a period of 90 days, and the time of formation of a vulcanized gel was noted. The following results were secured:

| Chloronitro compound | Gelling time |
|---|---|
| Blank | 95 hours. |
| 1-chloro-1-nitropropane | No gel in 90 days. |
| 2-chloro-1-nitropropane | Do. |
| 3-chloro-1-nitropropane | Do. |

The above example is representative of the results obtained at atmospheric temperature. The vulcanized gelling, however, is accelerated at elevated temperatures, and for testing purposes such elevated temperatures may be employed with considerable saving in time. In the following examples the tests were made at a temperature of 122° F.

*Example II*

The following rubber stock was prepared by mill mixing:

| Ingredient | Parts by weight |
|---|---|
| Raw rubber | 100 |
| Sulfur | 2.5 |
| Zinc oxide | 5 |
| Zinc dibutyl dithiocarbamate | 0.5 |
| Polybutyraldehyde-aniline accelerator | 0.5 |

The above stock was dissolved in benzol in a concentration equivalent to 5% by weight of rubber. One portion of the solution was utilized as a "blank" and various chloronitro compounds were incorporated in separate portions of the solution, in a concentration of 5%, based on the weight of the solution. The various resulting solutions were maintained at a temperature of 122° F. for 12 days and the time of formation of a vulcanized gel was noted. The following results were secured:

| Chloronitro compound | Gelling time |
|---|---|
| Blank | 38 hours. |
| 1-chloro-1-nitroethane | No gel in 12 days. |
| 1-1-dichloro-1-nitroethane | Do. |
| 1-chloro-1-nitropropane | Do. |
| 2-chloro-2-nitropropane | 80 hours. |
| 1-1-dichloro-1-nitropropane | No gel in 12 days. |
| 1-chloro-1-nitro-2-methyl-propane | Do. |
| 2-chloro-2-nitrobutane | 74 hours. |
| A mixture of 1-chloro-1-nitro-ethane, 1-chloro-1-nitropropane and 2-chloro-2-nitropropane. | 111 hours. |

*Example III*

The rubber stock employed in Example II was dissolved in naphtha in a concentration equivalent to 5% by weight of rubber, various chloronitro compounds were incorporated in separate portions of the resulting solution, in a concentration of 5% by weight, and the solutions were observed over a period of 12 days at 122° F. The following results were secured:

| Chloronitro compound | Gelling time |
|---|---|
| Blank | 146 hours. |
| 1-chloro-1-nitroethane | No gel in 12 days. |
| 1-1-dichloro-1-nitroethane | Do. |
| 1-chloro-1-nitropropane | Do. |
| 1-1-dichloro-1-nitropropane | Do. |

*Example IV*

The rubber stock employed in Example II was dissolved in benzol and in naphtha, in concentrations equivalent to 5% by weight of rubber. Various concentrations of 1-chloro-1-nitropropane were incorporated in separate portions of these solutions, and the resulting solutions were observed for a period of 12 days at 122° F. The following results were secured:

| Chloronitro compound | Concentration of chloronitrocompound—percent by weight of solution | Gelling time benzol solution | Gelling time naphtha solution |
|---|---|---|---|
| Blank | 0 | 33. | 138. |
| 1-chloro-1-nitropropane | 1 | 60. | 146. |
| 1-chloro-1-nitropropane | 5 | 156. | No gel in 12 days. |
| 1-chloro-1-nitropropane | 10 | No gel in 12 days. | Do. |

*Example V*

The rubber stock employed in Example II was dissolved in ethylene dichloride in a concentration equivalent to 5% by weight of rubber. One portion of the solution was employed as a "blank," and 1-chloro-1-nitropropane was added to another portion of the solution in a concentration of 5 per cent by weight. The resulting solutions were observed over a period of 12 days at 122° F., and the following results were secured:

| Chloronitro compound | Gelling time |
|---|---|
| Blank | 87 hours. |
| 1-chloro-1-nitropropane | No gel in 12 days. |

*Example VI*

The rubber stock employed in Example II was dissolved in benzol and in naphtha in concentrations equivalent to 5% by weight of rubber. Approximately 5% of 1-chloro-2-methyl-2-nitrobutane, based on the weight of the solution, was incorporated in portions of each of the solutions, and the solutions were observed over a period of 12 days at 122° F. The following results were secured:

| Chloronitro compound | Gelling time benzol solution | Gelling time naphtha solution |
|---|---|---|
| Blank | 33 hours. | 138 hours. |
| 1-chloro-2-methyl-2-nitrobutane | No gel in 12 days | No gel in 12 days. |

*Example VII*

The rubber stock employed in Example II was dissolved in benzol and in naphtha, in concentrations equivalent to 5% by weight of rubber. 1-bromo-1-nitropropane was incorporated in portions of the solutions in a concentration of 5% by weight, and the resulting solutions were observed over a period of 12 days at 122° F. The following results were secured:

| Bromonitro compound | Gelling time benzol solution | Gelling time naphtha solution |
|---|---|---|
| Blank | 22 hours. | 146 hours. |
| 1-bromo-1-nitropropane | No gel in 12 days. | No gel in 12 days. |

I do not wish to limit myself to the halogenated nitroparaffins indicated in the above examples since in the practice of my invention I have found that the halogenated nitroparaffins generally may be used. Mixtures of these halogenated nitroparaffins, such as are obtained by the chlorination of the products obtained by the direct nitration of the paraffin hydrocarbons may be used, as well as solutions of the halogenated nitroparaffins in other organic solvents, such as for example, alcohols, ketones, esters, and the like.

The choice of the particular halogenated nitroparaffin to be used will depend largely on the properties desired in the cement. The amount of halogenated nitroparaffin to be employed, in each individual case will depend on a number of factors such as for example, the particular halogenated nitroparaffin utilized, the character of the rubber cement treated, the amount of rubber contained therein, etc., as well as the effect of the particular halogenated nitroparaffin upon rubber. For example, 1-chloro-1-nitropropane is a good solvent for masticated rubber whereas, 1,1-dichloro-1-nitropropane dissolves the same rubber only fairly well, and the 2-chloro-2-nitropropane only slightly swells the rubber. Where, therefore, the particular halogenated nitroparaffin being used is a good or even fairly good solvent for rubber no particular difficulties are experienced in incorporating relatively large proportions of the halogenated nitroparaffin in the cement, but in cases where the halogenated nitroparaffin selected is not a rubber solvent, it can be incorporated into cements only in amounts up to those somewhat less than are required to precipitate the rubber from solution. Cements that have a tendency to form vulcanized gels in a relatively short time at atmospheric temperatures will, in general, require more halogenated nitroparaffin to stabilize the solution than in the case of cements of a more stable character. The exact amount of halogenated nitroparaffin to be used in a particular rubber cement may be readily ascertained by determining the tolerance of a cement for a particular halogenated nitroparaffin which it is desired to use and by determining the gelling time, at elevated temperatures, of cements containing slightly less than the amount of halogenated nitroparaffin required to effect coagulation of the rubber in the cement. Where the halogenated nitroparaffin is a rubber solvent it may be incorporated in the cement in amounts up to 100% by volume of the cement but such amounts are generally unnecessary and usually amounts ranging from 0.5%, or even less, up to 10% or 20% will give adequate protection.

I do not wish to be limited in any manner as to the specific ingredients that are incorporated into the rubber cement, for example, rubber may be used which has or has not been pre-masticated. The solvent may be any that is satisfactory for the purpose, such as gasoline, benzol, varnish and paint maker's naphtha, carbon tetrachloride, ethylene dichloride, etc. Fillers such as carbon black, clay, pigments, etc., and softeners such as mineral oil, and the like, may be added to the cements. Vulcanizing agents and accelerators may be selected which are known to be useful for their purpose. I do not wish to be limited as to the manner in which the halogenated nitroparaffin is to be incorporated into the cement. This may be done at any time during the process of manufacture but previous to the time when a gel begins to form.

Having described my invention, what I claim is:

1. The improvement in the manufacture of heat vulcanizing rubber cements which comprises reducing the tendency of said cements to form vulcanized gels on standing at ordinary temperatures by incorporating therein a halogenated nitroparaffin selected from the group consisting of chloro- and bromonitroparaffins having not more than eight carbon atoms, in an amount sufficient to retard the vulcanized gelling of the cement on standing.

2. The improvement in the manufacture of heat vulcanizing rubber cements which comprises reducing the tendency of said cements to form vulcanized gels on standing at ordinary temperatures by incorporating therein a halogenated nitroparaffin selected from the group consisting of chloro- and bromonitroparaffins having not more than eight carbon atoms, in an amount sufficient to retard vulcanized gelling of the cement on standing and less than is required to precipitate rubber from the cement.

3. The improvement in the manufacture of heat vulcanizing rubber cements which comprises reducing the tendency of said cements to form vulcanized gels on standing at ordinary temperatures by incorporating therein a chloronitroparaffin having not more than eight carbon atoms, in an amount sufficient to retard vulcanized gelling of the cement on standing and less than is required to precipitate rubber from the cement.

4. The improvement in the manufacture of heat vulcanizing rubber cements which comprises reducing the tendency of said cements to form vulcanized gels on standing at ordinary temperatures by incorporating therein a bromonitroparaffin having not more than eight carbon atoms, in an amount sufficient to retard vulcanized gelling of the cement on standing and less than is required to precipitate rubber from the cement.

5. The improvement in the manufacture of heat vulcanizing rubber cements which comprises reducing the tendency of said cements to form vulcanized gels on standing at ordinary temperatures by incorporating therein a monochloronitroparaffin having not more than eight carbon atoms, in an amount sufficient to retard vulcanized gelling of the cement on standing and less than is required to precipitate rubber from the cement.

6. The improvement in the manufacture of heat vulcanizing rubber cements which comprises reducing the tendency of said cements to form vulcanized gels on standing at ordinary temperatures by incorporating therein a monobromonitroparaffin having not more than eight carbon atoms, in an amount sufficient to retard vulcanized gelling of the cement on standing and less than is required to precipitate rubber from the cement.

7. The improvement in the manufacture of heat vulcanizing rubber cements which comprises reducing the tendency of said cements to form vulcanized gels on standing at ordinary temperatures by incorporating therein a dichloronitroparaffin having not more than eight carbon atoms, in an amount sufficient to retard vulcanized gelling of the cement on standing and less than is required to precipitate rubber from the cement.

8. A heat vulcanizing rubber cement containing a halogenated nitroparaffin selected from the group consisting of chloro- and bromonitroparaffins having not more than eight carbon atoms, in an amount sufficient to retard the vulcanized gelling of the cement on standing.

9. A heat vulcanizing rubber cement containing a halogenated nitroparaffin selected from the group consisting of chloro- and bromonitroparaffins having not more than eight carbon atoms, in an amount sufficient to retard vulcanized gelling of the rubber cement on standing and less than is required to precipitate rubber from the cement.

ARTHUR W. CAMPBELL.